United States Patent [19]

Myles

[11] Patent Number: 4,807,338

[45] Date of Patent: Feb. 28, 1989

[54] COMPUTER CONTROLLED HYDRAULIC DRIVE FOR INDEX TABLE

[75] Inventor: J. Scott Myles, Berkley, Mich.

[73] Assignee: J. E. Myles, Inc., Troy, Mich.

[21] Appl. No.: 141,549

[22] Filed: Jan. 7, 1988

[51] Int. Cl.$^4$ .............................................. B23Q 5/26
[52] U.S. Cl. ...................................... 29/38 C; 74/822;
91/35
[58] Field of Search ................ 29/38 C, 563, 564, 42,
29/48.5; 409/222, 221; 91/35, 39; 74/813 R,
813 C, 813 L, 816, 817, 822

[56] References Cited

U.S. PATENT DOCUMENTS

| | | | |
|---|---|---|---|
| 2,645,981 | 7/1953 | Hirvonen | 74/822 |
| 2,842,985 | 7/1958 | Grover | 74/822 X |
| 2,842,987 | 7/1958 | Schafer | 29/38 C |
| 2,916,950 | 12/1959 | Bullard | 74/821 |
| 2,975,657 | 3/1961 | Samuel | 74/822 |
| 3,168,842 | 2/1965 | Haggstrom | 74/822 |
| 3,543,609 | 12/1970 | Borodin | 74/818 |
| 3,686,979 | 8/1972 | Petri et al. | 74/813 C |
| 3,893,373 | 7/1975 | Bernd et al. | 91/35 |
| 4,450,753 | 5/1984 | Basrai et al. | 91/35 |
| 4,499,792 | 2/1985 | Tanabe | 74/825 |
| 4,575,291 | 3/1986 | Babel | 29/48.5 |

FOREIGN PATENT DOCUMENTS

| | | | |
|---|---|---|---|
| 2247005 | 5/1975 | France | 91/35 |
| 602266 | 7/1978 | Switzerland | 29/42 |
| 975261 | 11/1964 | United Kingdom | 74/822 |

OTHER PUBLICATIONS

Catalogue of AB Hagglund and Soner, Located S-89042, Mellansel, Sweden entitled "Hydraulic Motors Viking", Publication 611-02161, Edition 4, US 86-09-13, pp. 1-8.
Catalogue of Encoder Products Co. located at 1601B Dover Rd., Sandpoint, Idaho 83864-0868, entitled "EPC Encoder Products Co.-7252 Motion Controller-The Friendly Controller, Programmed in BASIC", pp. 1-8.
Catalogue of Abex Corporation, Dension Division located at 1220 Dublin Road Columbus, Ohio 43216, entitled "A More Powerful Way", The fully integrated Electrohydraulic Proportional Directional Valve, Series D1P-06, Bulletin 1403.3, pp. 1-4.

*Primary Examiner*—William Briggs
*Attorney, Agent, or Firm*—Cullen, Sloman, Cantor, Grauer, Scott & Rutherford

[57] ABSTRACT

The combination of an index table journaled upon a support upon a vertical axis and a computer controlled hydraulic drive including a hydraulic motor connected to the index table. A manifold is mounted upon the support and has a pressurized hydraulic chamber with a hydraulic accumulator mounted upon the manifold in communication with its chamber. A hydraulic power supply is connected to the manifold for pressurizing the accumulator at a pre-set level. An electro-hydraulic proportional valve having a power connector and a hydraulic directional control valve has an intake connected to the accumulator and a pair of outlet feed conduits connected to the hydraulic motor for selectively receiving pressurized hydraulic fluid from the proportional valve for feeding the motor at a predetermined flow, rate and duration for controlled rotational speed, acceleration and duration of incremental rotation of the motor and index table. A computer including a controller having a power source and a power lead is connected to the power connector for feeding bi-directional variable voltage electric command signals to the proportional valve in accordance with a pre-selected program.

20 Claims, 2 Drawing Sheets

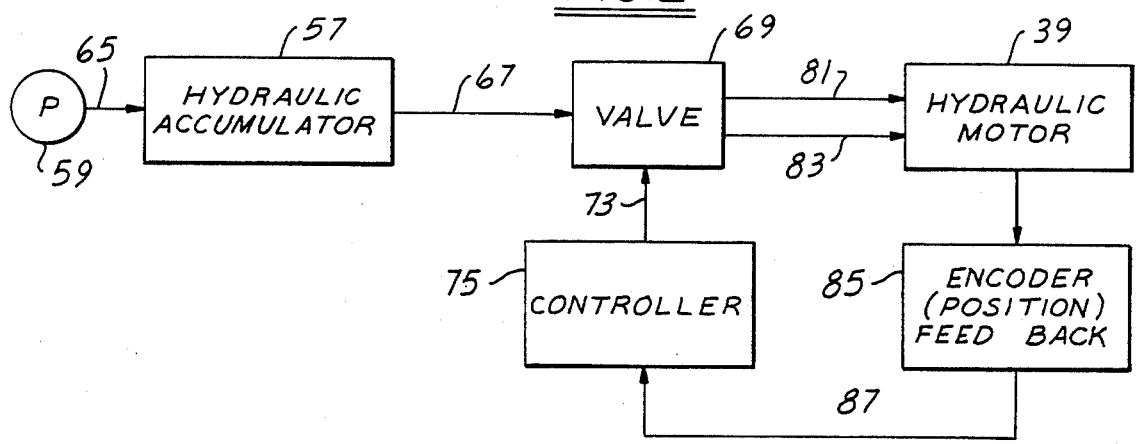
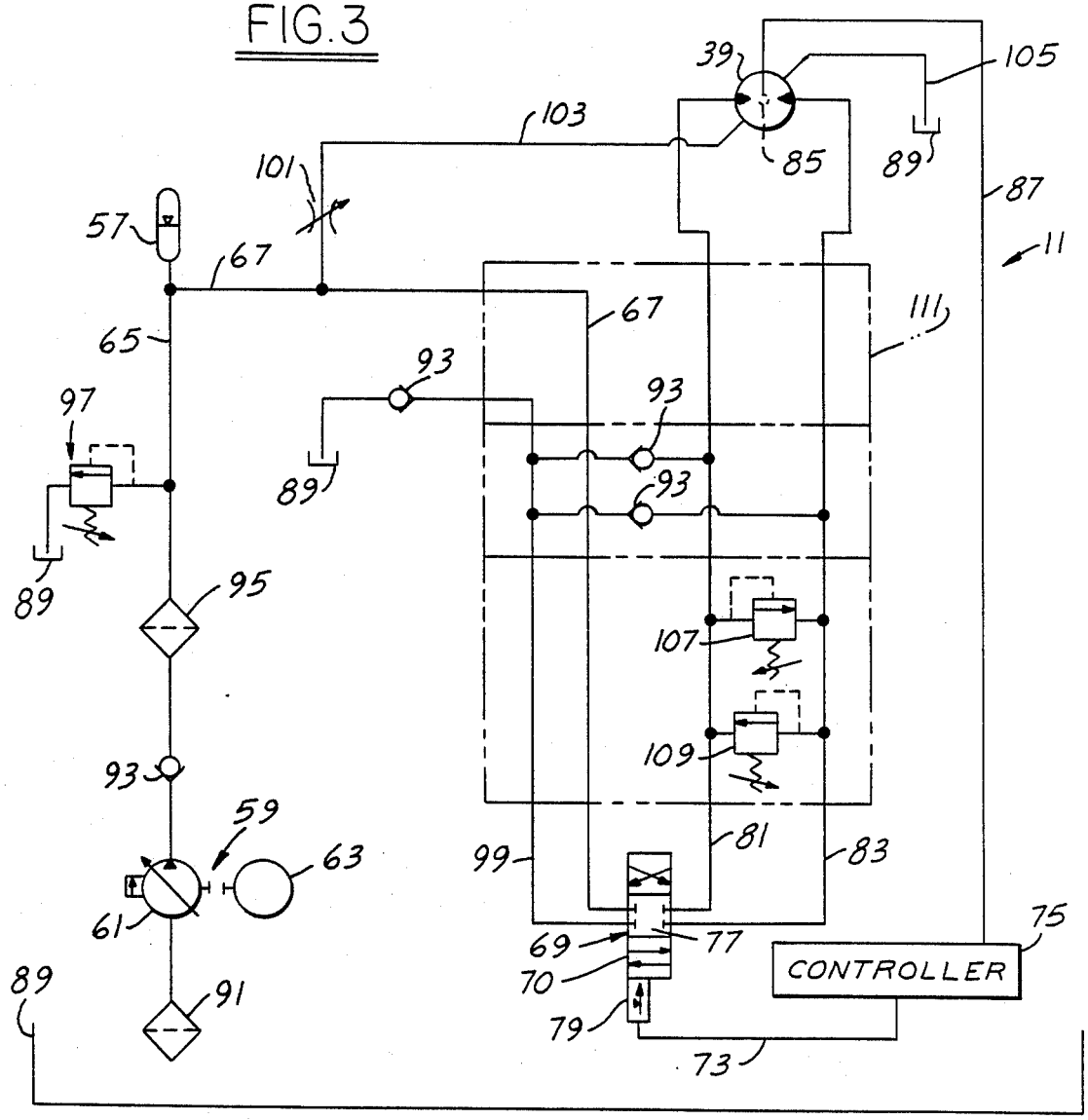

COMPUTER CONTROLLED HYDRAULIC DRIVE FOR INDEX TABLE

FIELD OF INVENTION

The invention relates to a computer controlled hydraulic drive for an index table having a plurality of radially spaced tooling blocks arranged at pre-selected angles throughout 360° for securing work pieces relative to corresponding similarly spaced machine tool stations, including a programmed controller for automatically, intermittently and successively rotating the index table and work pieces to each of the stations throughout 360° at a predetermined speed, predetermined acceleration and duration of stoppage at each station.

BACKGROUND OF THE INVENTION

Previously such index tables have been incrementally rotated by motor operated pinions and ring gears under manual and automatic control and with indexing up to 360°. Such power drive for an index table was slow and inaccurate, often requiring precise manual control or automatic and constant observation.

SUMMARY OF THE INVENTION

An important feature of the present invention is to provide a computer controlled hydraulic drive for an index table wherein as compared with a motor operated pinion and ring gear drive indexing up to 90° for illustration which previously took up to 7 seconds, approximately, such indexing takes 1 second. With average machining time per station 10 to 20 seconds, this could increase production from 300 parts per hour to 500 parts per hour and possibly eliminate a shift, or otherwise cut costs.

Another feature is to provide a computer controlled hydraulic drive for the index table which includes a hydraulic motor mounted upon the index table for rotating the index table upon a vertical axis. A manifold is mounted upon a support for the index table and has a pressurized fluid chamber. A hydraulic accumulator on the manifold is in communication with the chamber. A hydraulic power supply is connected to the manifold for pressurizing the accumulator and maintaining the pressure of the hydraulic fluid at a pre-set level.

Still another feature is to provide an electro-hydraulic proportional valve having a power connector and a directional control valve with an intake connected to the accumulator and a pair of outlet feed conduits connected to the hydraulic motor for selectively feeding pressurized hydraulic fluid from the directional control valve to the motor at a predetermined pressure, at a predetermined rate and duration for controlled rotational speed, acceleration and duration of incremental rotation and stoppage of said motor and connected index table.

Another feature is to provide a computer including a motion controller having a power source and a power lead connected to the proportional valve for feeding bi-directional variable electric command signals to the proportional valve in accordance with a preselected program.

Still another feature is to provide a hydraulic power supply for maintaining a uniform hydraulic fluid pressure within the manifold and accumulator in the range of 3,000 to 5,000 p.s.i., approximately.

An important feature is to provide in the hydraulic motor a stationary member depending therefrom upon the vertical axis of rotation within a rotatable casing connected to the index table.

As another feature a torque arm overlies and at one end is connected to the support for the index table and at its other end includes an apertured socket co-axial to and supporting retaining the stationary member upon the vertical axis.

Still another feature of the present invention is to provide a zero voltage from the controller to the proportional valve for neutralizing the proportional valve and blocking hydraulic flow to the feed conduits for the motor for positive programmed successive stops of the index table throughout 360°.

As important feature an encoder position feedback is interposed between the hydraulic motor and the controller for providing a variable position electric signal for the casing and index table to the controller for automatic correction of speed and location in accordance with a preselected program.

As another feature the controller, the proportional valve, the hydraulic motor and encoder position feedback define a closed electrical loop for continuously comparing actual position and motion with desired position and motion for automatic adjustment of the electric command signals of the controller for rotational speed and acceleration in accordance with the program.

As another feature a plurality of radial angularly spaced tooling blocks are mounted upon and around the index table at preselected differing or the same angles throughout 360° corresponding to the program. Each tooling block is adapted to mount a work piece. A plurality of inwardly directed angularly spaced machine tools corresponding to the tooling blocks respectively are mounted upon the support and wherein each work piece successively register with a machine tool between increments of rotation of the index table throughout 360°.

As still another feature the electro-hydraulic proportional valve includes an axially movable spool normally biasd to a central pressure fluid blocking position relative to a pair of conduits connected to the hydraulic motor adapted for driving the index table together with a two stage valve responding to bi-directional voltage command signals from the controller for selectively moving the spool variably off center for regulating and controlling the flow of pressure fluid through one of the conduits to the motor.

As another feature the directional control valve includes an exhaust conduit for returning exhaust fluids to a reservoir and wherein a pair of branch conduits interconnect the exhaust conduit with the motor conduits respectively and wherein a check valve is provided in each branch conduit for blocking fluid flow from the motor conduits to the exhaust conduit thereby preventing motion of the motor driven index table after it has come to a controlled stop.

These and other features and objects will be seen from the following specification and claims in conjunction with the appended drawings.

THE DRAWINGS

FIG. 2 is a schematic block diagram of the hydraulic and electrical connections for the computer controlled motor operated index table of FIG. 1.

FIG. 3 is a schematic hydraulic diagram therefore.

Figure 1:
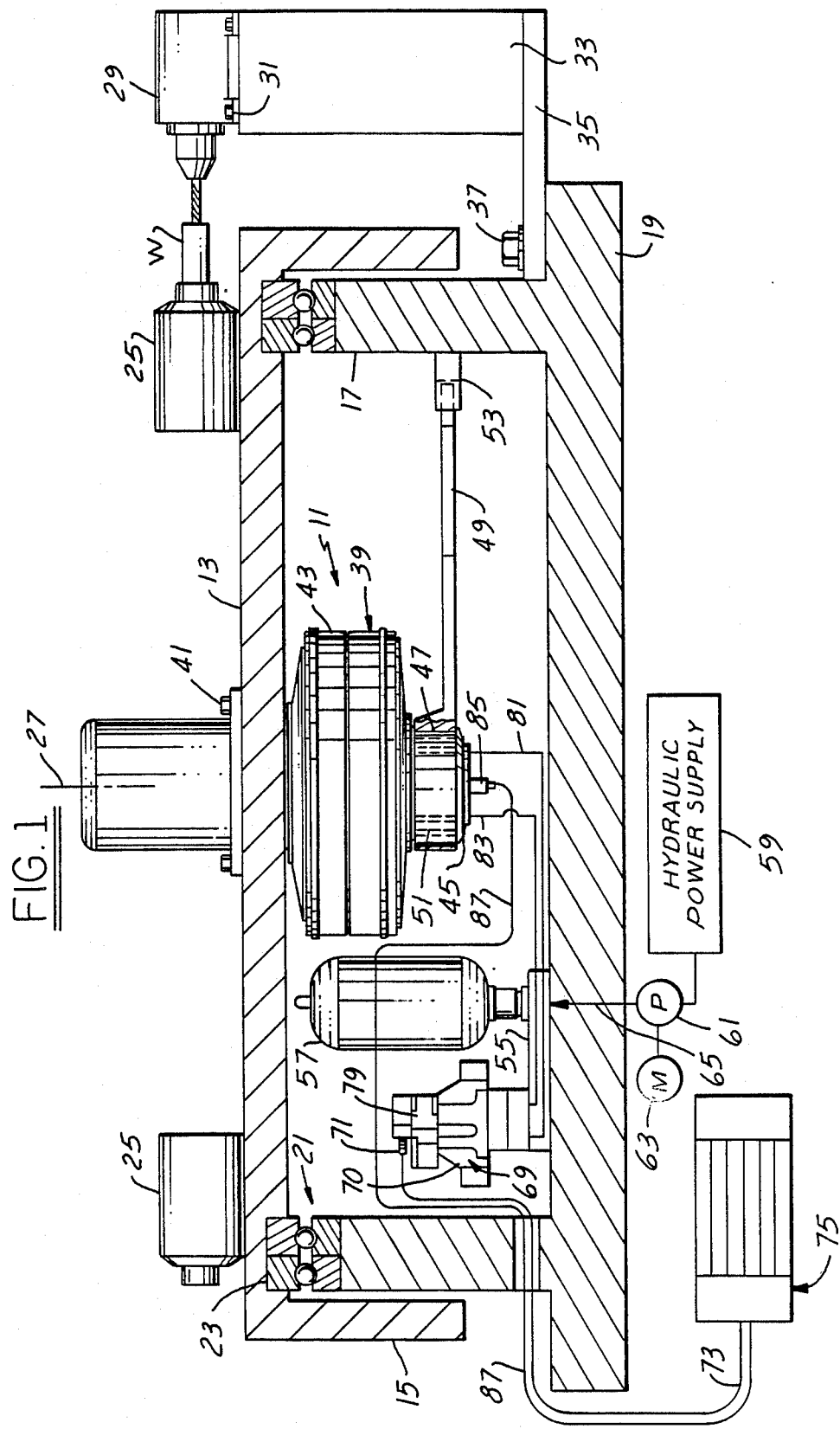
FIG. 1 is a fragmentary longitudinal section of the present hydraulic motor operated index table with a computer controlled hydraulic drive therefore schematically shown.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Referring to the drawings the present computer controlled hydraulic drive for an index table is generally indicated at 11 in FIG. 1 with the hydraulic diagram therefore shown in FIG. 3. In the illustrative embodiment index table 13 is circular and includes an annular depending flange 15 arranged outwardly of and concentric to the stationary cylindrical base 17 upon support 19.

Ball bearings 21 are interposed between base 17 and index table 13 and are nested and retained within the annular undercut channel 23 within the index table. A plurality of angularly spaced and angularly related tooling blocks 25 are mounted upon index table 13 and secured thereto, two being shown for illustration, secured uon the index table and adapted to support work pieces W. The tooling blocks may be arranged at any preselected angle throughout 360° around the perimeter of the index table such as at 30°, 60°, 90°, 120° for example, though not limited thereto. The increments of spacing between the respective tooling blocks is infinitely variable depending upon the machining required in the respective work pieces as the index table is incrementally rotated around its vertical axis 27 with respect to the stationary machine tools 29. The machine tools are anchored as at 31 upon upright supports 33 mounted upon a plurality of lateral supports 35 which overly support 19 and are suitably secured thereto by fasteners 37. The respective machine tools 29 may be drills, taps, boring tools, milling tools or broaching tools or the like at a plurality of angularly related stations corresponding to the spacing of the respective tooling blocks 25 upon index table 13 throughout 360°.

Accordingly as is conventional practice wherein work pieces are mounted upon an index table in an angularly spaced relation, a control means is normally provided for incrementally rotating the index table for stoppage of the respective work pieces W at the corresponding machine tools 29. Such stoppage is for periods of time as is required to provide a machining operation in increments throughout 360° for completing the machining of the respective work pieces. The machining tools 29 are progressively engagable with each work piece held upon index table 13, as it is rotated to a particular station and stopped.

Mounted upon index table 13 upon and along its vertical axis 27 is a rotatable hydraulic motor 39, in the range of 2' to 4' in diameter, for illustration, though not limited thereto. In the present preferred embodiment the source of hydraulic motor 39 is A. B. Hagglund and Soner, Mellansel, Sweden sometimes referred to as Hagglunds. Motor 39 is of the radial piston type and is secured by a plurality of fasteners 41 to index table 13. The motor is a high torque hydraulic motor providing the rotative drive for index table 13.

The present hydraulic motor 39, FIG. 1, includes a rotatable casing 43 and therein a stationary cylinder block mounting a plurality of radially directed reciprocal pistons, not shown, for controlling rotation of casing 43. The cylinder block includes an axial shank 45 which is mounted within socket 47 upon the outer end of torque arm 49 in registry with motor axis 27. A suitable bushing 51 is interposed between shank 45 and socket 47. Torque arm 49 overlies support 19 and at one end is projected into and secured within socket 53 mounted upon cylindrical base 17.

The hydraulic connections for the drive and operation of the present hydraulic motor 39 include manifold 55 mounted upon support 19. The manifold has an internal pressurized hydraulic fluid chamber. Overlying the manifold and secured thereto is the hydraulic accumulator 57 with pressurized nitrogen therein mounted upon and sealed over manifold 55 with the interior of the accumulator in communication with the hydraulic fluid chamber of the manifold. The hydraulic accumulator is a standard part which may be purchased on the market and is sold by Greer Company and others as a component in the present hydraulic circuit for the drive of rotatable hydraulic motor 39, FIG. 3.

A hydraulic power supply is generally indicated at 59 in FIGS. 1 and 3 and includes variable volume, variable speed pump 61, schematically shown, driven by the variable speed electric motor 63. In the illustrative embodiment the present variable volume pump delivers pressurized hydraulic fluid in the range of 3,000 to 5,000 p.s.i., for illustration, though not limited thereto. Under some conditions higher or lower pressures may be required. Pump 61 forming a part of the hydraulic power supply delivers through conduit 65 delivers pressurized hydraulic fluid to manifold 55 for communication with accumulator 57. Branch conduit 67 or inlet pipe from hydraulic accumulator 57 is connected to the electro-hydraulic proportional valve 69. The valve is sometimes referred to as an Abex Dennison valve manufactured by Apex Corporation, Dennison Division, Columbus, Ohio. The present electro-hydraulic proportional valve includes directional control valve 70, FIGS. 1 and 3, and the electrical connector 71 which through power lead 73 is connected to the output of the computer or controller 75. The controller provides a bi-directional electrical control command signal or voltage through power lead 73 to the electro-hydraulic proportional valve 69. The command signal is plus or minus five (5) volts or in the range of five (5) to ten (10) volts.

The electro-hydraulic proportional valve includes a directional control valve 70 with a third stage reciprocal spool 77, schematically shown in FIG. 3, and a two stage valve 79 controlling movements of spool 77 from a normal spring biased fluid blocking central position to various positions off center. This determines the amount of such spool movement, and the volume of pressurized fluids delivered through conduits 81 or 83 to one of the opposite sides of hydraulic motor 39. The operation of the electro-hydraulic proportional valve 69 determines the extent of opening of spool 77 from a neutral blocking position, to control velocity of rotation of casing 43 of hydraulic motor 39, and its acceleration. Operation of the proportional valve 69 interrupts rotary movements of index table 13 when controller 75 provides a zero voltage command signal such as positions the spool 77 in a central fluid blocking position cutting off all flow through either of the conduits 81 and 83 to hydraulic motor 39.

A position feedback encoder device 85 is shown in the drawings as axially mounted adjacent casing 43 of hydraulic motor 39. The encoder is connected by lead 87 to controller 75 so that the computer knows the exact angular position of the index table 13 at any time.

In a servo motor system of this type controller 75 supplies a command signal voltage to proportional valve 69 for driving hydraulic motor 39. The feedback device 85 such as the present encoder sends an electric position signal back to the controller 75 to close the electrical loop. The controller is responsible for continually comparing the actual motion and position with the desired motion and position in accordance with a pre-set program utilized by the controller. If there is any deviation in this, the controller automatically adjusts the command signal delivered to the electro-hydraulic proportional valve 69. This allows the closed loop system to be essentially insensitive to the variations in loading conditions or other systems perimeters. Controller 75 continuously monitors the position of the index table 13 in accordance with the desired position as pre-set from the program employed and compares actual position and motion with desired position and motion in accordance with the program for an automatic adjustment of the voltage command signals regulating rotational speed and acceleration of the hydraulic motor 39 in accordance with the program.

Referring to the hydraulic diagram, FIG. 3, there is schematically shown an oil reservoir 89 storing a quantity of hydraulic fluid with a strainer 91 therein in communication with the input of conduit 65 to the variable volume pump 61 driven by motor 63. The pump delivers pressurized fluid through check valve 93, through filter 95 and adjustable pressure relief valve 97. Thus the pressure can be pre-set for pressurizing accumulator 57 with excess pressurized fluid returning to reservoir 89. Branch conduit 67 from accumulator 57 connects the pressure inlet 67 of directional control valve 70 forming a part of proportional valve 69.

With the valve spool 77 of the directional control valve 70 in any position other than the neutral position shown in FIG. 3, pressurized fluid in accordance with the preselected program employed by the controller is delivered in controlled amounts and volume through one of the conduits 81 and 83 with the other conduit exhausting back to directional control valve 70 and through conduit 99, through the adjacent check valve 93 and back to reservoir 89.

Adjustable flow control valve 101 is interposed within branch conduit 103 which communicates directly with hydraulic motor 39 for providing a continuous limited supply of pressurized hydraulic fluid thereinto. A corresponding drain line 105 exhausts to reservoir 89.

Interposed between the respective motor conduits 81 and 83 are pair of safety relief valves 107 schematically shown for respectively blocking hydraulic flow between said conduits when the motor is in a controlled stop position under the action of the controller at zero voltage to absolutely assure that there is no rotation of hydraulic motor 39.

A hydraulic subplate 111 is schematically shown dash lines in FIG. 3 with respect to the hydraulic diagram and including safety relief valves 107 and 109 and the corresponding check valves 93. The check valves extend between exhaust conduit 99 and the respective hydraulic lines 81 and 83 to hydraulic motor 39. The function of the check valves 93 is also for safety purposes to prevent any rotation of the hydraulic motor when it is under a controlled stoppage by controller 75.

The present controller 75 is a form of a computer and is available on the market by Encoder Products Company, P.O. Box 1548, of Sandpoint, Id. Controller 75 utilizes a pre-set program for regulating and controlling motion of hydraulic motor 39. The operation of the controller in accordance with the program provides for accurate positioning of the index table and its incremental movements throughout 360°, location of the work pieces W with respect to the corresponding machine tools 29, and the pre-set angular increments of rotation throughout 360°. It further regulates the duration of stoppage at the respective stations for machining and the time involved in moving from one station to the next station, acceleration of the turn table and its speed of rotation.

The present motion controller 75 is a sophisticated micro-computer system which has the flexibility and power of a computer with an industrial design built in it in order to effectively control the hydraulic motor by providing bi-directional electrical voltage command signals to the proportional valve 69 in accordance with the preselected program. This provides pressurized hydraulic fluid to motor 39 at a preselected pressure, as for example in the range of 3,000 to 5,000 p.s.i. at a predetermined volume of flow, at a predetermined rate and duration for controlling rotational speed, acceleration and duration of incremental rotation of the motor and connected index table as well as duration of stoppage of machining at the individual stations.

It has been found from use that the present controller operated hydraulic drive for index tables speeds up the operation of index table machining. Heretofore in conventional methods using a motor driven pinion and ring gear indexing 90° took up to 7 seconds. In accordance with the present disclosure corresponding indexing can be accomplished in 1 second, approximately. With average machining time per station 10 to 20 seconds, this could increase production from 300 parts per hour to 500 parts per hour and possibly eliminate an entire shift under some conditions, or cut manufacturing costs.

The index table 13 is adapted for rotation in equal or unequal increments normally through 360°, namely one single revolution, with a plurality of angularly spaced work pieces through a series of machining steps relative to corresponding angularly related machined tools 29, FIG. 1.

Rotation of the index table 13 may be in equal or unequal increments depending upon the program used by controller 75 which will determine the speed of rotation, the existence of zero voltage signal at a time and for a period wherein there is zero rotation of the turn table, during a machining operation as well as a speed of rotation and acceleration of rotation.

The position feedback encoder 85, FIGS. 1, 2 and 3, is axially mounted as at 27, FIG. 1, and connected by suitable lead 87 back to controller 75 so that in effect the controller knows the angular position of the index table at all times and can provide the necessary corrections automatically in accordance with the program employed by the controller.

The hydraulic motor is of a high torque type and is rated in the illustrative embodiment at 5 gallons per minute at 10 horse power. The accumulator 57 is capable of discharging liquid at the rate of 350 gallons per minute. The hydraulic fluid has a pressure in the range of 3,000 to 5,000 p.s.i., for illustration. As the accumulator 57 discharges under the control of the electro-hydraulic proportional valve, the power curve decays rapidly. Thus, there is a continuous charging of accumulator 57 from the hydraulic power supply 59 when the motor is not indexing and in between indexing. Pressure is always available at the predetermined level such as 3,000 to 5,000 p.s.i. whatever pressure is required in order to index the load in accordance with a pre-set program.

The present hydraulic power supply including variable volume and variable pressure pump 61 is referred to as a pressure compensator variable volume pump available on the market and is supplied by Hagglunds, Dennison Company of Sweden. The pump outlets through conduit 65 to manifold 55 for communication with its interior pressure chamber at all times in communication with accumulator 57. The output of accumulator 57 is connected to input line 67 to the electro-hydraulic proportional valve 69, FIG. 3, accept when controller 75 is providing zero voltage at the proportional valve connection 71. Operation of the electro-hydraulic proportional valve 69 responds to bi-directional variable electric command voltage signals from controller 75 through lead 73 to two stage valve 79 forming a part of the electro-hydraulic proportional valve 69 and for the direct control of spool 77 within directional control valve 70.

Thus, the proportional valve responds to voltage supplied from controller 75 to lead 73 and connection 71, FIG. 1. The amount of opening of proportional valve 69, the duration of opening and the rate of opening are determined under pre-programmed operation of controller 75. This determines the amount of pressure fluid and extent and degree of rotation of index table, speed of rotation and acceleration as well as determining the period where there is a zero voltage signal to the proportional valve such as stops motor 39 for and during a particularly machining operation. Thus, the computer controlled mechanism described supplies high pressure hydraulic fluid to hydraulic motor 39 for a better and faster remote control for index table 13.

The structural detail of the present electro-hydraulic proportional valve to the extent as described is believed sufficient for an explanation as to structure, function and operation of the present electro-hydraulic proportional valve. The valve is one element in the present combination and is supplied by Abex Corporation, Columbus, Ohio.

The construction of valve spool 77 and the directional control valve 70 is such that the valve may be reversed so that motor 39 can be reversed if desired. Normally this is not done in the present environment. It could be used for backup or remachining. The exhaust from hydraulic motor 39 returns to the proportional valve 69 through either of the conduits 81, 83 and from valve 69 through exhaust conduit 99 and check valve 93 back to reservoir 89.

The operation of the hydraulic power supply 59, 61, 63 is such that when the accumulator 57 becomes fully charged in accordance with the program employed with controller 75, the excess fluid under pressure is returned to reservoir 89 through the adjustable pressure relief valve 97.

The pair of oppositely directed safety relief valves 107 and 109, FIG. 3, interconnect motor conduits 81 and 83 and provide for cancelling or equalizing pressure between the respective conduits to hydraulic motor 39. This assures that motor 39 will stay stopped on fluid pressure cut off at valve 69 under the operation of controller 75.

Having described my invention reference should now be had to the following claims.

I claim:

1. In combination, an index table rotatably mounted and journaled upon a support and located upon a vertical axis and a computer controlled hydraulic drive for the index table;

said drive comprising;

a hydraulic motor mounted upon said index table and upon said axis, said motor being rotatable upon said axis;

a manifold mounted upon said support and having a pressurized hydraulic fluid chamber;

a hydraulic accumulator mounted upon said manifold in communication with said chamber;

a hydraulic power supply connected to said manifold for pressurizing said accumulator and maintaining the pressure of the hydraulic fluid at a pre-reset level;

an electro-hydraulic proportional valve having a power connector and a hydraulic directional control valve with an intake connected to said accumulator and a pair of outlet feed conduits connected to said hydraulic motor for selectively receiving pressurized hydraulic fluid from said proportional valve for feeding pressurized hydraulic fluid to said motor at a predetermined flow, at a predetermined rate and duration for controlling rotational speed, acceleration and duration of incremental rotation of said motor and connected index table; and a computer including a motion controller having a power source and a power lead connected to said proportional valve for feeding bi-directional variable electric command signals to said proportional valve in accordance with a pre-selected program.

2. In the combination of claim 1, said power supply maintaining a uniform hydraulic fluid pressure within said accumulator in the range of 3,000 to 5,000 p.s.i., approximately.

3. In the combination of claim 1, said hydraulic motor including a stationary member depending therefrom located upon said axis; and a rotatable casing connected to said index table.

4. In the combination of claim 3, a torque arm overlying and at one end connected to said support, with its other end including an apertured socket coaxial to and supportively retaining said stationary member upon said axis.

5. In the combination of claim 1, said command signal being in the range of 5 to 10 volts.

6. In the combination of claim 1, said command signal being plus or minus 5 volts.

7. In the combination of claim 5, zero voltage from said controller to said proportional valve neutralizing said proportional valve and blocking hydraulic flow in said feed conduits for positive programmed successive stops of said index table throughout 360°.

8. In the combination of claim 1, an encoder position feedback interposed between said hydraulic motor and controller providing a variable position electrical signal of said motor and index table to said controlller.

9. In the combination of claim 8, said controller, proportional valve, hydraulic motor and encoder position feedback defining a closed electrical loop, for continuously comparing actual position and motion with desired and motion for an automatic adjustment of said command signals for rotational speed and acceleration in accordance with said program.

10. In the combination of claim 1, a plurality of radial angularly spaced tooling blocks mounted upon and around said index table, at pre-selected angles throughout 360° corresponding to said program, said tooling blocks adapted to mount and support a work piece; and
- a plurality of inwardly directed angularly spaced machine tools corresponding to said blocks respectively and mounted upon said support;
- each work piece successively registering with a machine tool between increments of rotation of said index table throughout 360°.

11. In the combination of claim 1, said support including an upstanding cylindrical base arranged upon said axis; and
- bearings arranged in a circle upon said axis interposed between said base and said index table.

12. In the combination of claim 11, said index table having an annular groove arranged upon said axis and overlying said base, cooperatively receiving said bearings.

13. In the combination of claim 11, and
- a cylindrical flange depending from the perimeter of said index table loosely and protectively enclosing said bearings and base.

14. In the combination of claim 1, said proportional valve including a two stage valve connected to and controlling said directional control valve.

15. In the combination of claim 14, said directional control valve including an axially movable spool normally spring biased to a central pressure fluid blocking position relative to said conduits;
- said two stage valve responding to bi-directional voltage command signals from said controller selectively moving said spool variably off center regulating and controlling flow of pressure fluid through one of said conduits to said motor.

16. In the combination of claim 1, said hydraulic power supplying including a reservoir containing hydraulic fluid; and
- a motorized variable volume pump having an intake communicating with said reservoir and an outlet connected to said accumulator for continuously maintaining said pre-set pressure level.

17. In the combination of claim 16, a branch conduit interconnecting said accumulator and said fluid motor for delivering limited controlled amounts of hydraulic fluid under pressure to the interior of said hydraulic motor; and
- a drain pipe from said motor to said reservoir for continuous limited circulation of hydraulic fluid through said hydraulic motor.

18. In the combination of claim 15, said directional control valve including an exhaust conduit for returning exhaust hydraulic fluids to said reservoir;
- a pair of branch conduits interconnecting said exhaust conduit with said motor conduits respectively, by passing some exhaust hydraulic fluid selectively into said conduits; and
- a check valve in each branch conduit blocking hydraulic fluid flow from said motor conduits to said exhaust conduit, preventing motion of said motor and index table after it has come to a controlled stop.

19. In the combination of claim 1, a pair of oppositely directed adjustable relief valves interposed between said motor conduits to prevent any rotation of said hydraulic motor when under a controlled stoppage.

20. In the combination of claim 16, the connection of the hydraulic power supply to said manifold including a conduit between said pump outlet and said manifold; and
- an adjustable pressure relief valve in said conduit with a return drain to said reservoir, for maintaining a pre-set pressure of the hydraulic fluid under pressure within said accumulator.

* * * * *